US012791880B2

(12) United States Patent
Yang et al.

(10) Patent No.: US 12,791,880 B2
(45) Date of Patent: Nov. 10, 2026

(54) CONTACT LENS

(71) Applicant: PEGAVISION CORPORATION, Taoyuan City (TW)

(72) Inventors: Te-Sheng Yang, Taoyuan City (TW); Han-Yi Chang, New Taipei City (TW); Wei-Jia Ting, Taoyuan City (TW); Yu-Yen Chiang, Taoyuan City (TW); Yi-Fang Huang, Kinmen County (TW)

(73) Assignee: PEGAVISION CORPORATION, Taoyuan City (TW)

( * ) Notice: Subject to any disclaimer, the term of this patent is extended or adjusted under 35 U.S.C. 154(b) by 786 days.

(21) Appl. No.: 18/318,737

(22) Filed: May 17, 2023

(65) Prior Publication Data

US 2023/0400708 A1 Dec. 14, 2023

Related U.S. Application Data

(60) Provisional application No. 63/351,432, filed on Jun. 12, 2022.

(51) Int. Cl.

| | |
|---|---|
| ***G02C 7/04*** | (2006.01) |
| ***G02B 1/04*** | (2006.01) |
| ***G02C 11/00*** | (2006.01) |

(52) U.S. Cl.
CPC .............. *G02C 11/10* (2013.01); *G02B 1/043* (2013.01); *G02C 7/04* (2013.01); *G02C 7/049* (2013.01)

(58) Field of Classification Search
CPC .......... G02C 11/10; G02C 7/04; G02C 7/049; G02C 7/046; G02C 7/047; G02C 11/00;
(Continued)

(56) References Cited

U.S. PATENT DOCUMENTS

2013/0308092 A1* 11/2013 Groisman ................ G02C 7/04 351/159.04
2015/0286072 A1 10/2015 Clarke
(Continued)

FOREIGN PATENT DOCUMENTS

CN 106104365 A 11/2016
CN 108065909 A 5/2018
(Continued)

*Primary Examiner* — Pinping Sun
*Assistant Examiner* — Gabriel A Sanz
(74) *Attorney, Agent, or Firm* — Li & Cai Intellectual Property Office

(57) ABSTRACT

A contact lens is provided and includes a lens body and an embedded structure embedded in the lens body. The lens body includes a cornea portion and a sclera portion surrounding the cornea portion, and a connection boundary between the cornea portion and the sclera portion has an inner diameter within a range from 11.5 mm to 12.3 mm. The cornea portion defines a layout boundary spaced apart from the connection boundary by a distance within a range from 3.8 mm to 4.2 mm. The embedded structure is arranged outside of the layout boundary, and has a three-dimensional (3D) carrier. The 3D carrier has at least one oxygen permeable channel having a central angle of 360 degrees. Along a top-down direction, at most 70% of an area of an annular layout region between the layout boundary and the connection boundary is shielded by the embedded structure.

19 Claims, 13 Drawing Sheets

(58) Field of Classification Search
CPC .............. G02B 1/043; B29D 11/00038; B29D 11/00826
See application file for complete search history.

(56) References Cited

U.S. PATENT DOCUMENTS

| | | | |
|---|---|---|---|
| 2017/0278619 A1 | 9/2017 | Lee et al. | |
| 2019/0293964 A1 | 9/2019 | Takaki et al. | |
| 2019/0324292 A1 | 10/2019 | Tuan | |
| 2020/0038240 A1 | 2/2020 | de Juan, Jr. et al. | |
| 2020/0201078 A1* | 6/2020 | Kuiper | G02C 7/085 |
| 2020/0257138 A1* | 8/2020 | Iwasaki | G01N 1/14 |
| 2020/0301170 A1 | 9/2020 | Shelef | |
| 2021/0132409 A1* | 5/2021 | Hackett | G02C 7/04 |
| 2021/0181531 A1 | 6/2021 | Reedy et al. | |
| 2021/0263336 A1 | 8/2021 | Gupta et al. | |

FOREIGN PATENT DOCUMENTS

| | | | |
|---|---|---|---|
| CN | 110023821 | A | 7/2019 |
| CN | 110292352 | A | 10/2019 |
| CN | 210019704 | U | 2/2020 |
| CN | 112612144 | A | 4/2021 |
| CN | 113039477 | A | 6/2021 |
| JP | 57206424 | A | 12/1982 |
| JP | 2016177287 | A | 10/2016 |
| JP | 201892111 | A | 6/2018 |
| TW | 202006428 | A | 2/2020 |
| WO | WO2020097205 | A1 | 5/2020 |

* cited by examiner

CONTACT LENS

CROSS-REFERENCE TO RELATED PATENT APPLICATION

This application claims the benefit of priority to the U.S. Provisional Patent Application Ser. No. 63/351,432 filed on Jun. 12, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a contact lens, and more particularly to a smart contact lens.

BACKGROUND OF THE DISCLOSURE

When an interior component is embedded in a conventional smart contact lens, the arrangement of the interior component in the conventional smart contact lens is designed according to only the optical function or the optical region of the conventional contact lens, and is usually not designed with consideration to a structure of the eye. Accordingly, the conventional smart contact lens cannot meet different oxygen permeability requirements.

SUMMARY OF THE DISCLOSURE

In response to the above-referenced technical inadequacies, the present disclosure provides a contact lens to effectively improve on the issues associated with conventional smart contact lenses.

In order to solve the above-mentioned problems, one of the technical aspects adopted by the present disclosure is to provide a contact lens, which includes a lens body and an embedded structure. The lens body includes a cornea portion defining a central axis and a sclera portion that surrounds the cornea portion. Moreover, a connection boundary between the cornea portion and the sclera portion has an inner diameter within a range from 11.5 mm to 12.3 mm. The cornea portion defines a layout boundary spaced apart from the connection boundary by a distance that is within a range from 3.8 mm to 4.2 mm. The embedded structure is embedded in the lens body and is arranged outside of the layout boundary. The embedded structure includes a three-dimensional (3D) carrier having at least one oxygen permeable channel that has a central angle of 360 degrees with respect to the central axis. Along a top-down direction parallel to the central axis, the layout boundary and the connection boundary jointly define an annular layout region therebetween, and at most 70% of an area of the annular layout region is shielded by the embedded structure.

Therefore, the lens body of the contact lens in the present disclosure is designed according to the structure of the eye to provide a suitable region or boundary (e.g., the layout boundary defined by the cornea portion) for embedding the embedded structure, such that more requirements for oxygen permeability can be met through the cooperation of components of the contact lens (e.g., at most 70% of the area of the annular layout region is shielded along the top-down direction by the embedded structure).

Moreover, in the contact lens provided by the present disclosure, the structural design of the 3D carrier (e.g., the at least one oxygen permeable channel formed on the 3D carrier has a central angle of 360 degrees with respect to the central axis) enables the annular layout region to allow oxygen to pass therethrough, so that a percentage of the annular layout region that is shielded by the 3D carrier along the top-down direction can be less than a percentage by which the oxygen permeability of the annular layout region is reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
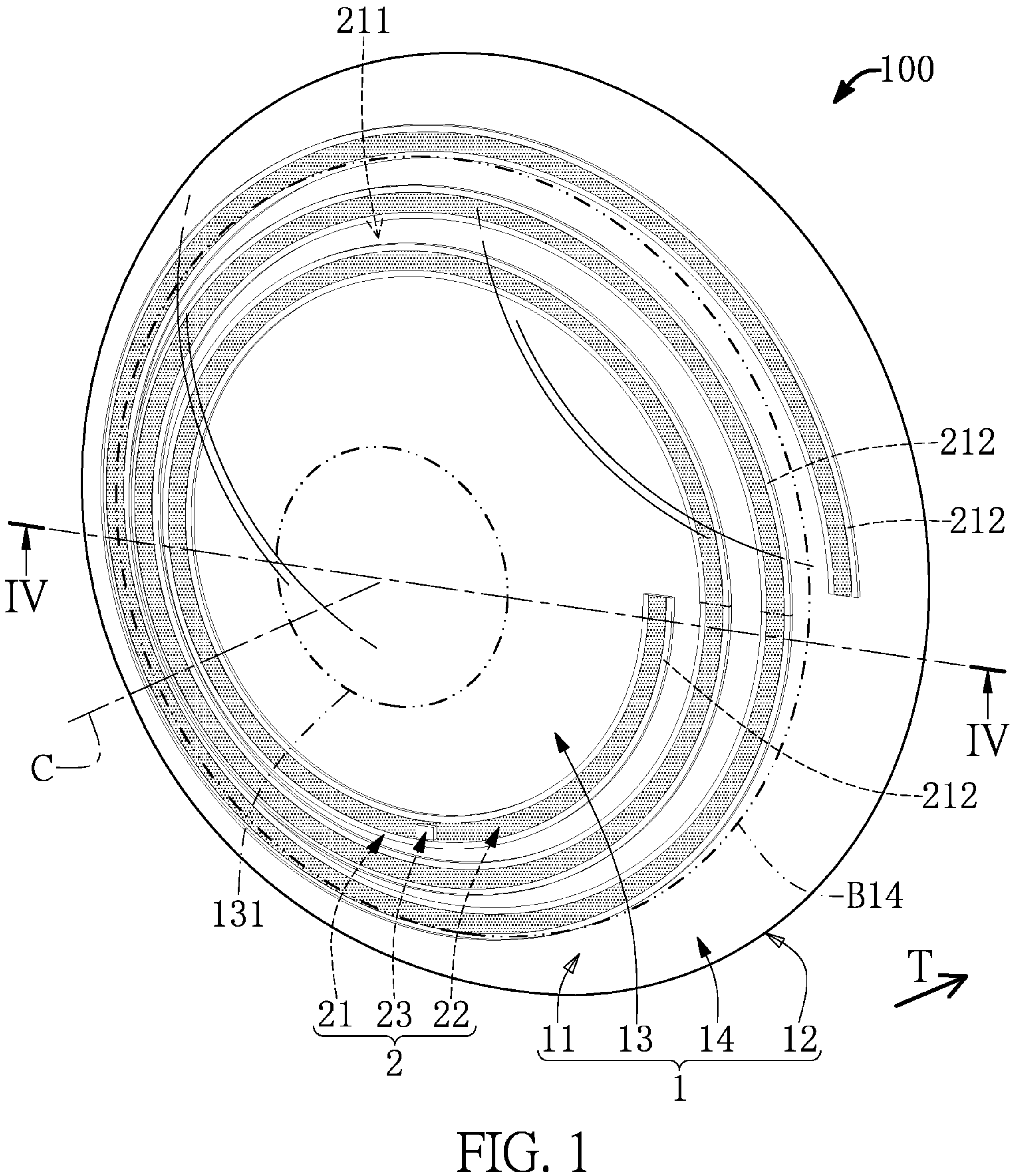
FIG. 1 is a schematic perspective view of a contact lens according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
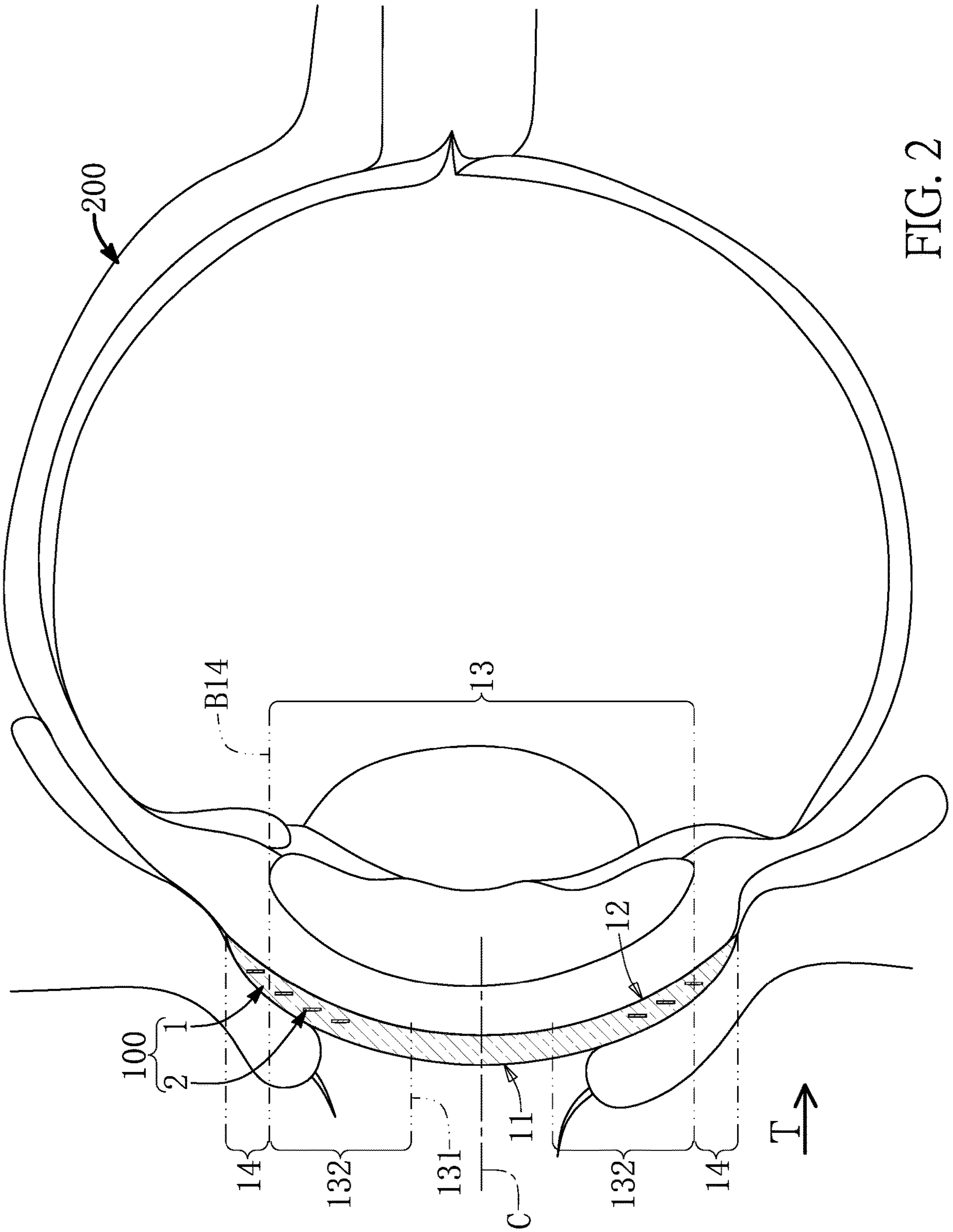
FIG. 2 is a schematic planar view showing the contact lens of FIG. 1 worn on an eye.
Figure 3:
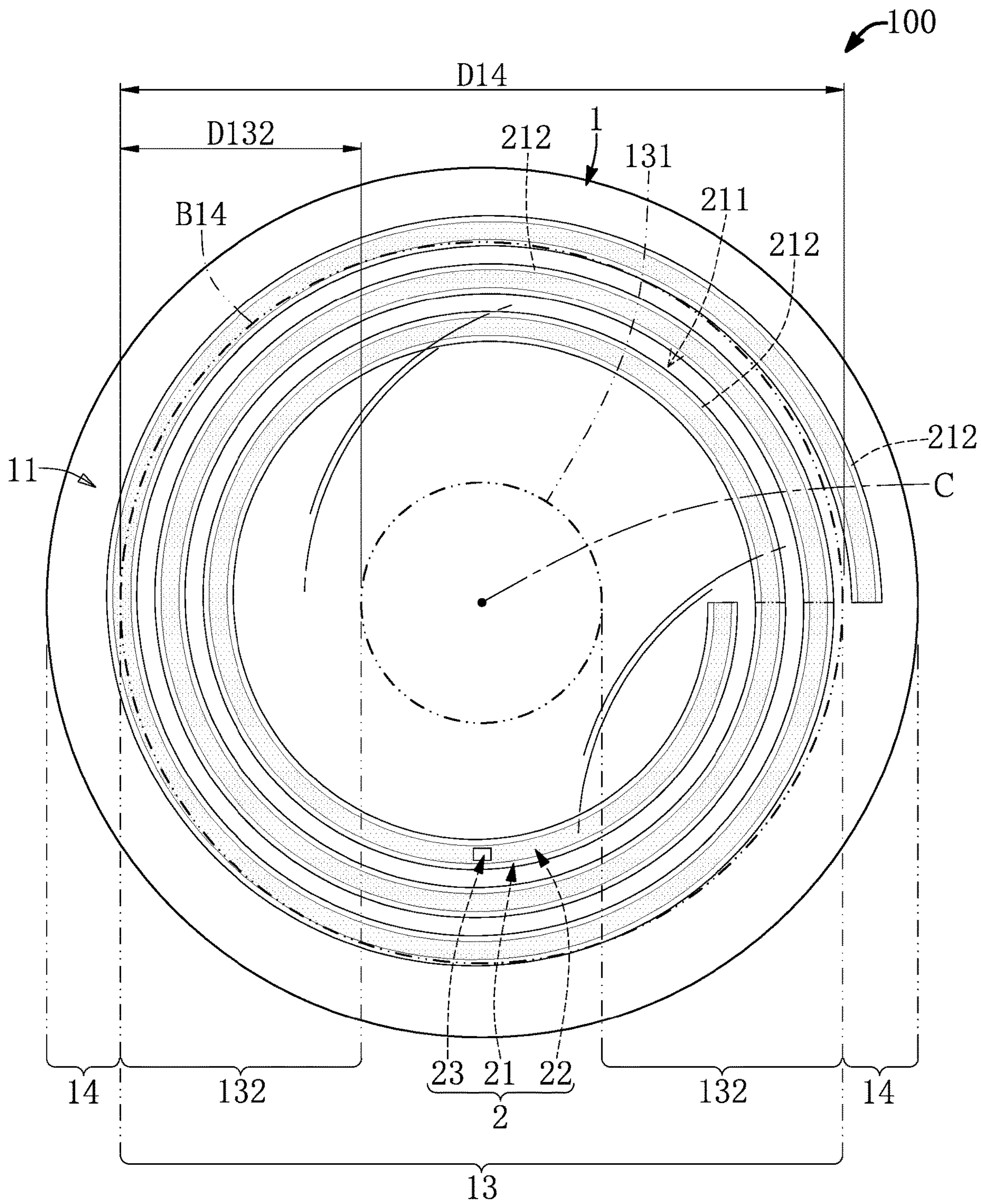
FIG. 3 is a schematic top view of FIG. 1 along a top-down direction.
Figure 4:
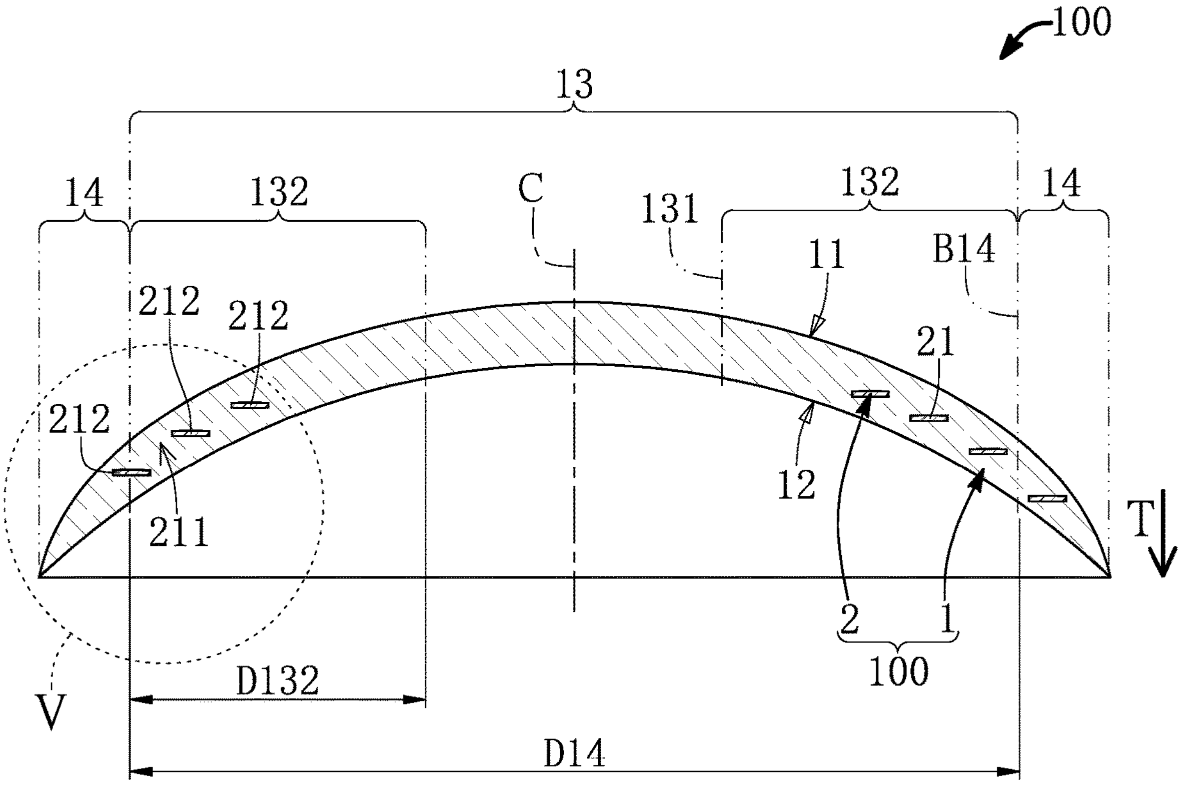
FIG. 4 is a schematic cross-sectional view taken along line IV-IV of FIG. 1.
Figure 5:
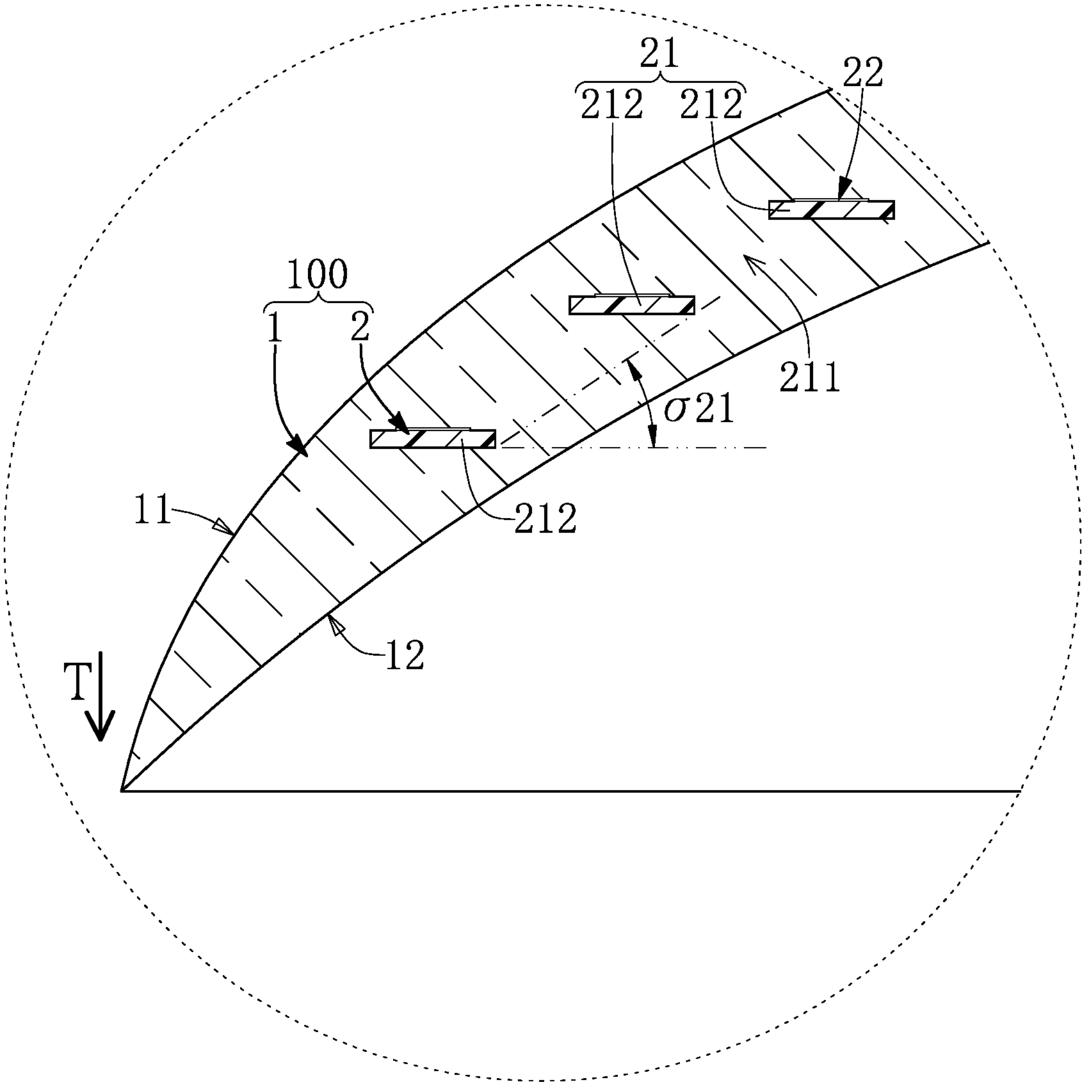
FIG. 5 is schematic enlarged view of part V of FIG. 4.

Referring to FIG. 1 to FIG. 7, a first embodiment of the present disclosure is provided. As shown in FIG. 1 to FIG. 3, the present embodiment provides a contact lens 100, which can be a smart contact lens. The contact lens 100 can be worn on an eye 200 of user (as shown in FIG. 3) or can be embedded in the eye 200 (not shown in the drawings) according to design requirements.

The contact lens 100 in the present embodiment can have a correcting function for a refractive error that includes hyperopia, myopia, astigmatism, presbyopia, or astigmatism-presbyopia; or, the contact lens 100 can be a makeup lens without the correcting function.

The contact lens 100 in the present embodiment includes a lens body 1 and an embedded structure 2 that is embedded in the lens body 1. The lens body 100 in the present embodiment is made of a breathable material. For example, the material of the lens body 1 can be hydrogel (e.g., p-HEMA), silicone hydrogel, silicone elastomer, or rigid gap-permeable (RGP) material, but the present disclosure is not limited thereto.

As shown in FIG. 2 to FIG. 5, surfaces of the lens body 1 have a front surface 11 and a rear surface 12 that is opposite to the front surface 11, and an outer diameter of the lens body 1 is substantially within a range from 14 mm to 14.5 mm. The lens body 1 includes a cornea portion 13 and a sclera portion 14 that surrounds the cornea portion 13, and a connection boundary B14 between the cornea portion 13 and the sclera portion 14 has an inner diameter D14 within a range from 11.5 mm to 12.3 mm.

In the present embodiment, the above portions of the lens body 1 are divided according to the structure of the eye 200. For example, the cornea portion 13 is provided to substantially cover a cornea of the eye 200 without vascularity, and the sclera portion 14 is provided to substantially cover a sclera of the eye 200 having vascularity. In other words, the size, function, and application of the cornea portion 13 in the present embodiment are different from those of an optical portion of any contact lens.

Moreover, when the cornea portion 13 of the contact lens 100 in the present embodiment is provided for allowing the embedded structure 2 to be embedded therein, the cornea portion 13 needs to have a sufficient degree of oxygen permeability. Accordingly, the cornea portion 13 defines a layout boundary 131 spaced apart from the connection boundary B14 by a distance D132 that is within a range from 3.8 mm to 4.2 mm. In other words, the cornea portion 13 has an annular layout region 132 defined between the layout boundary 131 and the connection boundary B14, and the annular layout region 132 has a basic oxygen permeability when the embedded structure 2 is not embedded in the annular layout region 132.

In addition, the cornea portion 13 defines a central axis C, and a center of the cornea portion 13, a center of the layout boundary 131, and a center of the connection boundary B14 are located on the central axis C.

The embedded structure 2 includes a three-dimensional (3D) carrier 21, a circuit 22 (e.g., a metallic circuit) formed on the 3D carrier 21, and an electronic component 23 that is assembled to the 3D carrier 21. In the present embodiment, the 3D carrier 21 is a flexible printed circuit board (FPCB), polymer materials of the 3D carrier 21 can include polyimide (PI), liquid-crystal polymer (LCP), polyethylene terephthalate (PET), or poly(ethylene 2,6-naphthalene dicarboxylate) (PEN), and the electronic component 23 can be at least one of a chip, a battery, a sensing member, and a display member, but the present disclosure is not limited thereto.

For example, in other embodiments of the present disclosure not shown in the drawings, according to the design requirements, the embedded structure 2 of the contact lens 100 can only include the 3D carrier 21, or the embedded structure 2 can include the 3D carrier 21 and the electronic component 23 (or the circuit 22) that is cooperated with the 3D carrier 21. Furthermore, a quantity or shape of the electronic component 23 (or the circuit 22) can be adjusted or changed according to design requirements. The following description describes the structure and connection relationship of each component of the contact lens 100.

Figure 6:
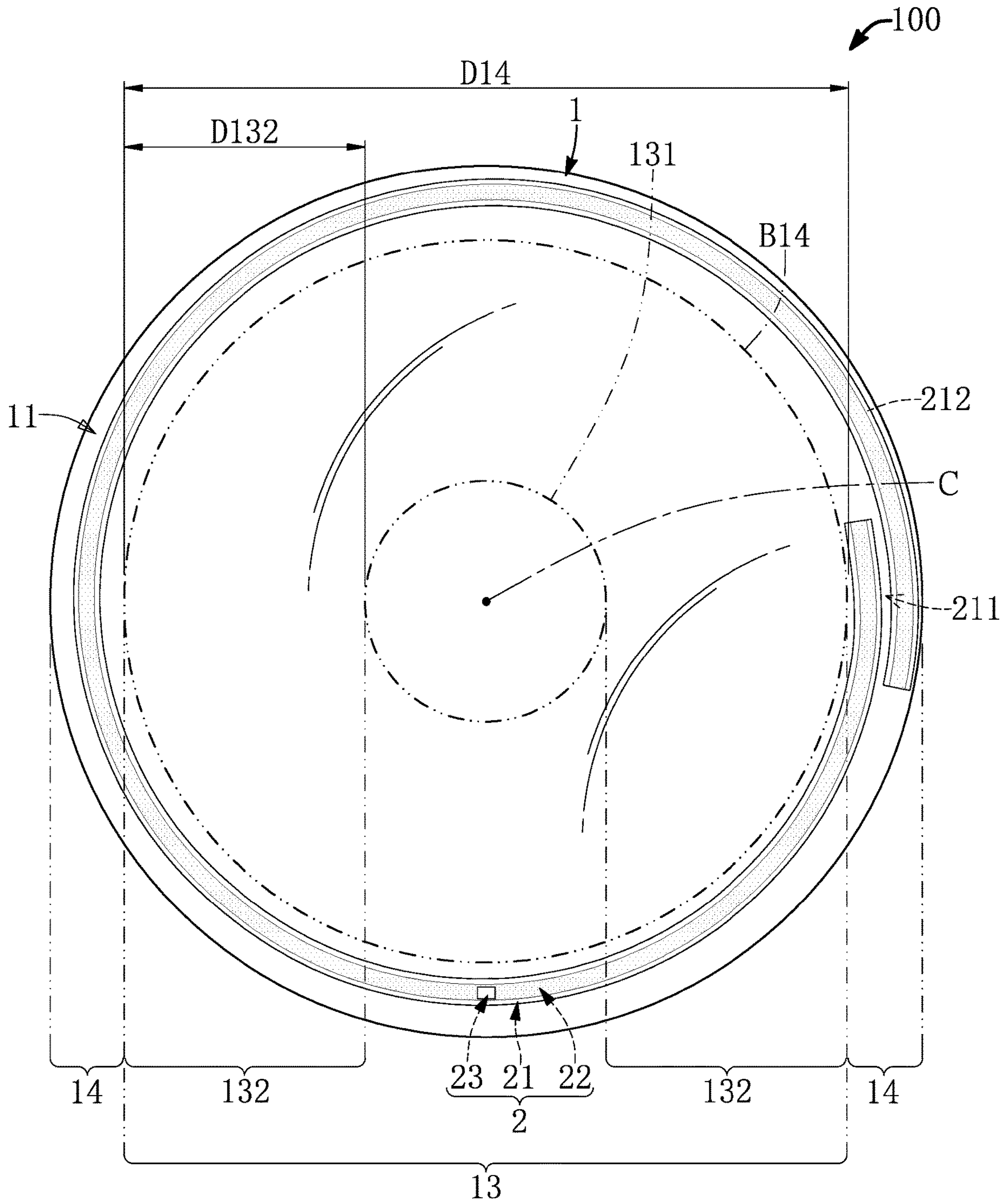
FIG. 6 is a schematic top view of the contact lens in another configuration according to the first embodiment of the present disclosure.
Figure 7:
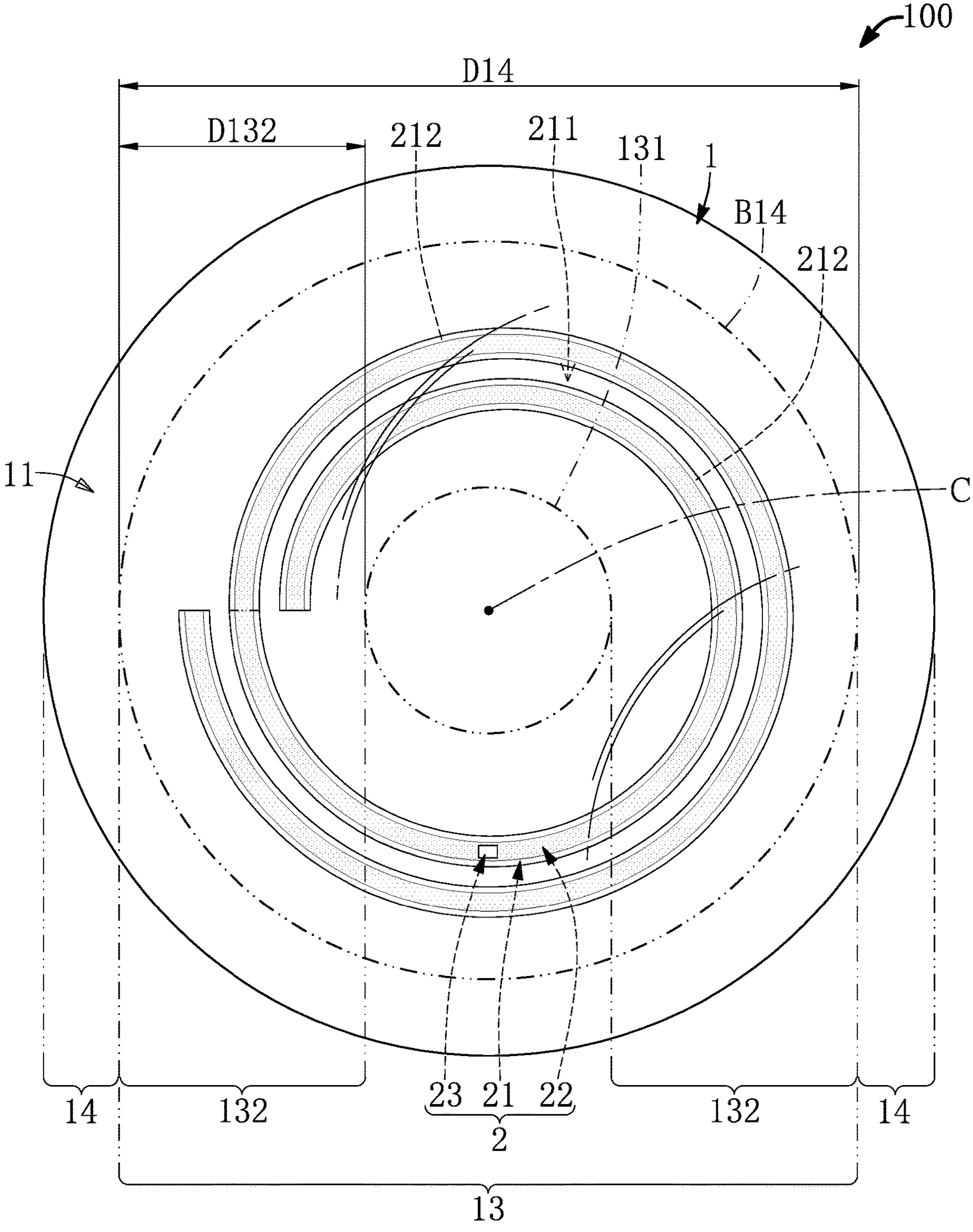
FIG. 7 is a schematic top view of the contact lens in yet another configuration according to the first embodiment of the present disclosure.
Figure 8:
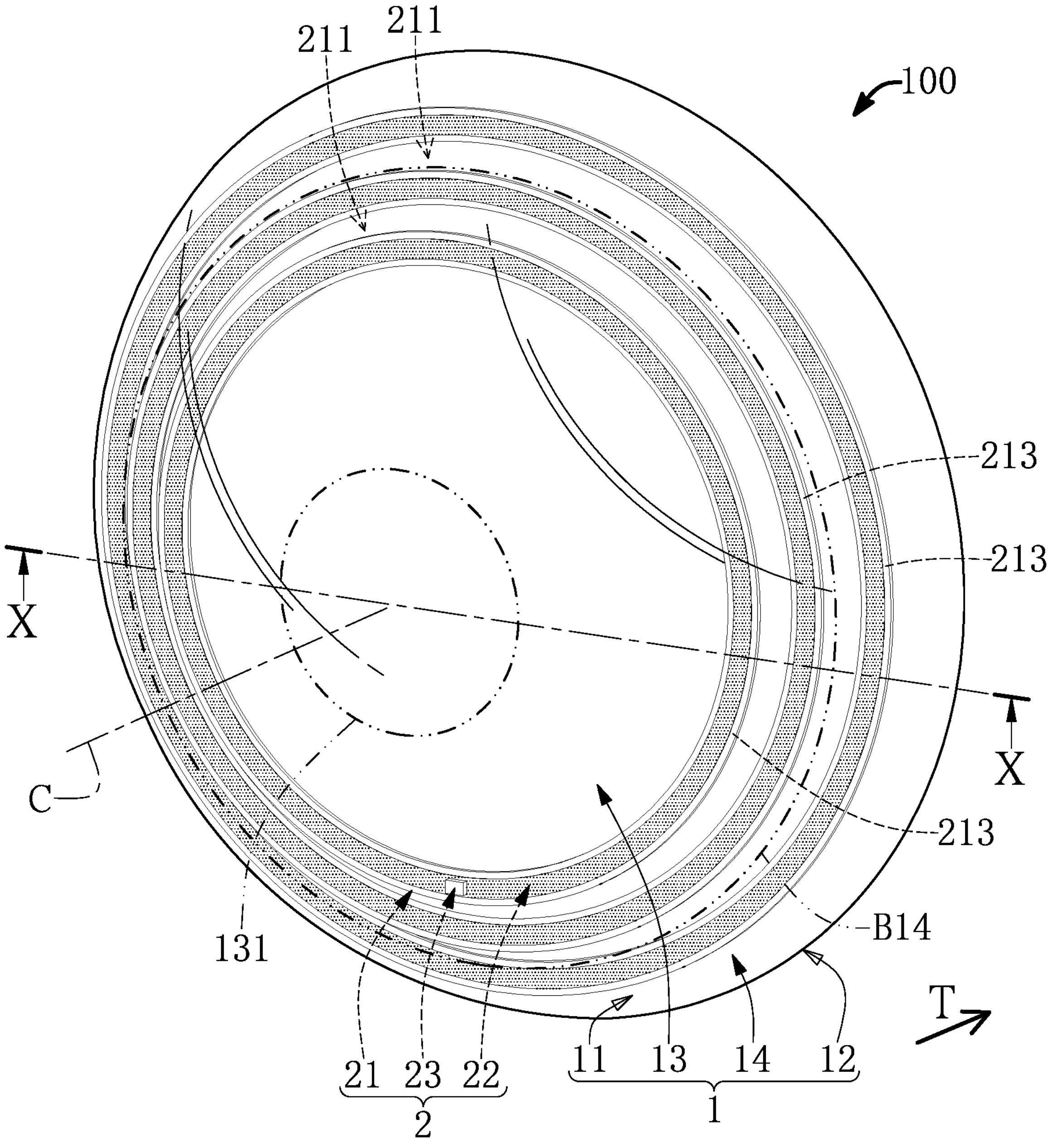
FIG. 8 is a schematic perspective view of the contact lens according to a second embodiment of the present disclosure.
Figure 9:
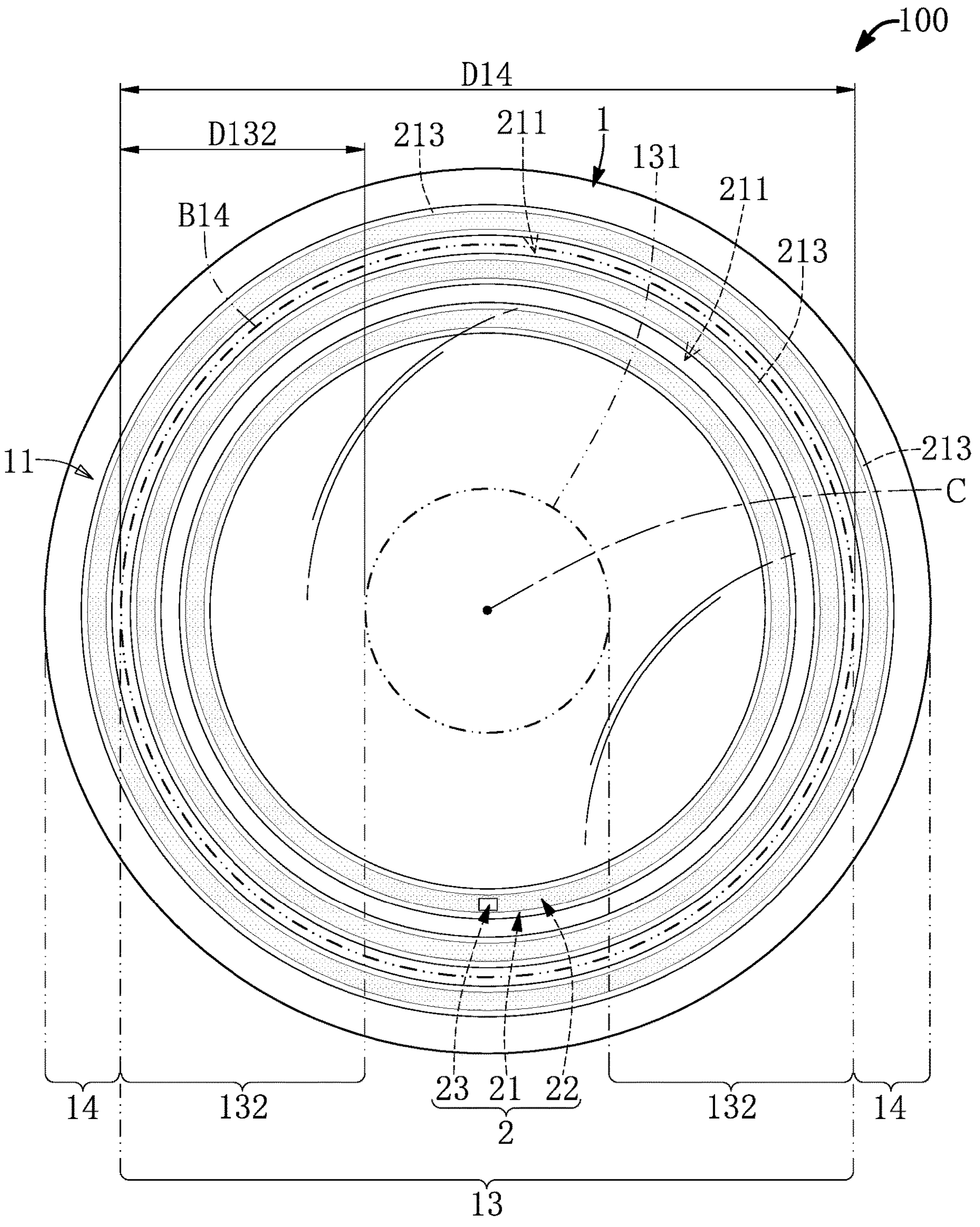
FIG. 9 is a schematic top view of FIG. 8 along the top-down direction.
Figure 10:
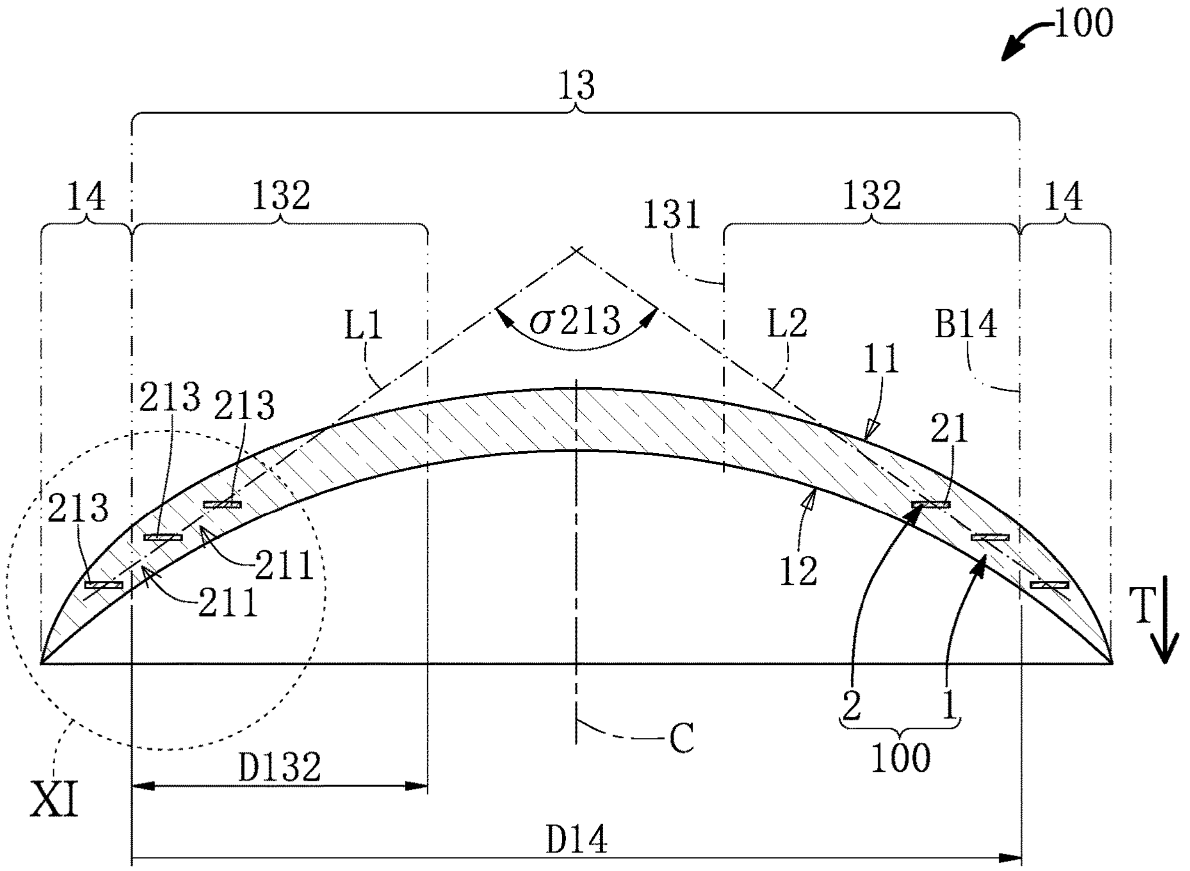
FIG. 10 is a schematic cross-sectional view taken along line X-X of FIG. 8.
Figure 11:
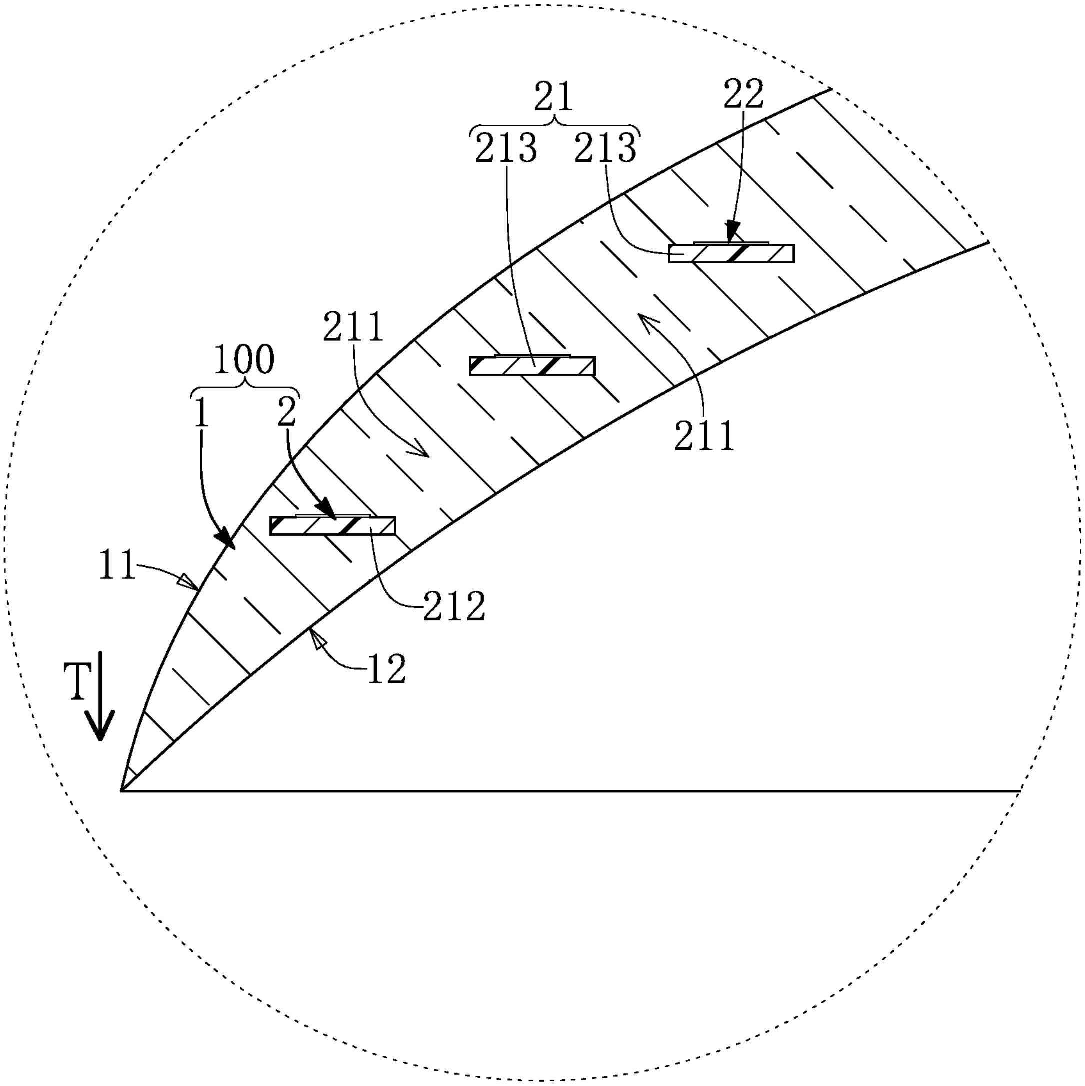
FIG. 11 is schematic enlarged view of part XI of FIG. 10.

The embedded structure 2 is embedded in the lens body 1 and is arranged outside of the layout boundary 131. In other words, the embedded structure 2 in the present embodiment is excluded from being arranged inside of the layout boundary 131. Specifically, the embedded structure 2 of the present embodiment disclosed in the following description is described as shown in FIG. 1 to FIG. 5 and is only embedded in the sclera portion 14 and the annular layout region 132 of the lens body 1, but the present disclosure is not limited thereto. According to various requirements, the embedded structure 2 can be only embedded in the sclera portion 14 of the lens body 1 as shown in FIG. 6; or, the embedded structure 2 can be only embedded in the annular layout region 132 of the lens body 1 as shown in FIG. 7.

Moreover, as shown in FIG. 2 to FIG. 5, along a top-down direction T parallel to the central axis C, at most 70% of an area of the annular layout region 132 of the cornea portion 13 is shielded by the embedded structure 2. It should be noted that the above percentage can be adjusted or changed according to different design requirements (e.g., various design requirements of oxygen permeability).

For example, according to different design requirements, 50% to 70% of the area of the annular layout region 132 is shielded along the top-down direction T by the embedded structure 2 so as to have an oxygen permeability that is 70% to 30% of the basic oxygen permeability; or, 30% to 50% of the area of the annular layout region 132 is shielded along the top-down direction T by the embedded structure 2 so as to have an oxygen permeability that is 85% to 70% of the basic oxygen permeability; or, 6% to 30% of the area of the annular layout region 132 is shielded along the top-down direction T by the embedded structure 2 so as to have an oxygen permeability that is 100% to 85% of the basic oxygen permeability.

Specifically, the embedded structure 2 can be in cooperation with the cornea portion 13 and the sclera portion 14 to precisely control the oxygen permeability of the annular layout region 132. The embedded structure 2 preferably includes at least part of the following technical features. For example, the 3D carrier 21 can effectively control the annular layout region 132 to meet a specific design requirement the oxygen permeability by forming at least one oxygen permeable channel 211 having a central angle of 360 degrees with respect to the central axis C.

In the present embodiment, the 3D carrier 21 is in a spiral shape, a quantity of the at least one oxygen permeable channel 211 is one, and the oxygen permeable channel 211 has a spiral shape arranged along the 3D carrier 21. The 3D carrier 21 is not in contact with any one of the front surface 11 and the rear surface 12 of the lens body 1 (e.g., the 3D carrier 21 is substantially spaced apart from any one of the front surface 11 and the rear surface 12 by a same distance), and the 3D carrier 21 preferably has a lead angle θ521 within a range from 10 degrees to 75 degrees.

Moreover, the 3D carrier 21 spirally extends along the central axis C from the layout boundary 131 toward the sclera portion 14 by crossing the connection boundary B14, but the present disclosure is not limited thereto. Specifically, the 3D carrier 21 includes a plurality of spiral segments 212 that are connected end to end, and at least one of the spiral segments 212 is embedded in the annular layout region 132 and has a central angle of 360 degrees with respect to the central axis C.

In other words, along the top-down direction T parallel to the central axis C, the spiral segments 212 are not overlapped with each other, the spiral segments 212 are separated from each other by the oxygen permeable channel 211, and the spiral segments 212 have a substantial same width, but the present disclosure is not limited thereto. For example, in other embodiments of the present disclosure not shown in the drawings, the shape of each portion of the 3D carrier 21 can be adjusted or changed according to design requirements, and the 3D carrier 21 can further have at least one hole in any form for meeting different requirements.

In summary, the lens body 1 of the contact lens 100 in the present embodiment is designed according to the structure of the eye 200 to provide a suitable region or boundary (e.g., the layout boundary 131 defined by the cornea portion 13) for embedding the embedded structure 2, such that more requirements for oxygen permeability can be met through the cooperation of components of the contact lens 100 (e.g., at most 70% of the area of the annular layout region 132 is shielded along the top-down direction T by the embedded structure 2).

Moreover, in the contact lens 100 provided by the present embodiment, the structural design of the 3D carrier 21 (e.g., the at least one oxygen permeable channel 211 formed on the 3D carrier 21 has a central angle of 360 degrees with respect to the central axis C) enables the annular layout region 132 to allow oxygen to pass therethrough, so that a percentage of the annular layout region 132 that is shielded by the 3D carrier 21 along the top-down direction T can be less than a percentage by which the oxygen permeability of the annular layout region 132 is reduced (e.g., when a percentage of the annular layout region 132 shield along the top-down direction T by the 3D carrier 21 is 50%, the oxygen permeability reduces 30% relative to the basic oxygen permeability).

Second Embodiment

Referring to FIG. 8 to FIG. 13, a second embodiment of the present disclosure, which is similar to the first embodiment of the present disclosure, is provided. For the sake of brevity, descriptions of the same components in the first and second embodiments of the present disclosure (e.g., the lens body 1) will be omitted herein, and the main difference between the second embodiment and the first embodiment is the embedded structure 2 (e.g., the 3D carrier 21), which is disclosed as follows.

Figure 12:
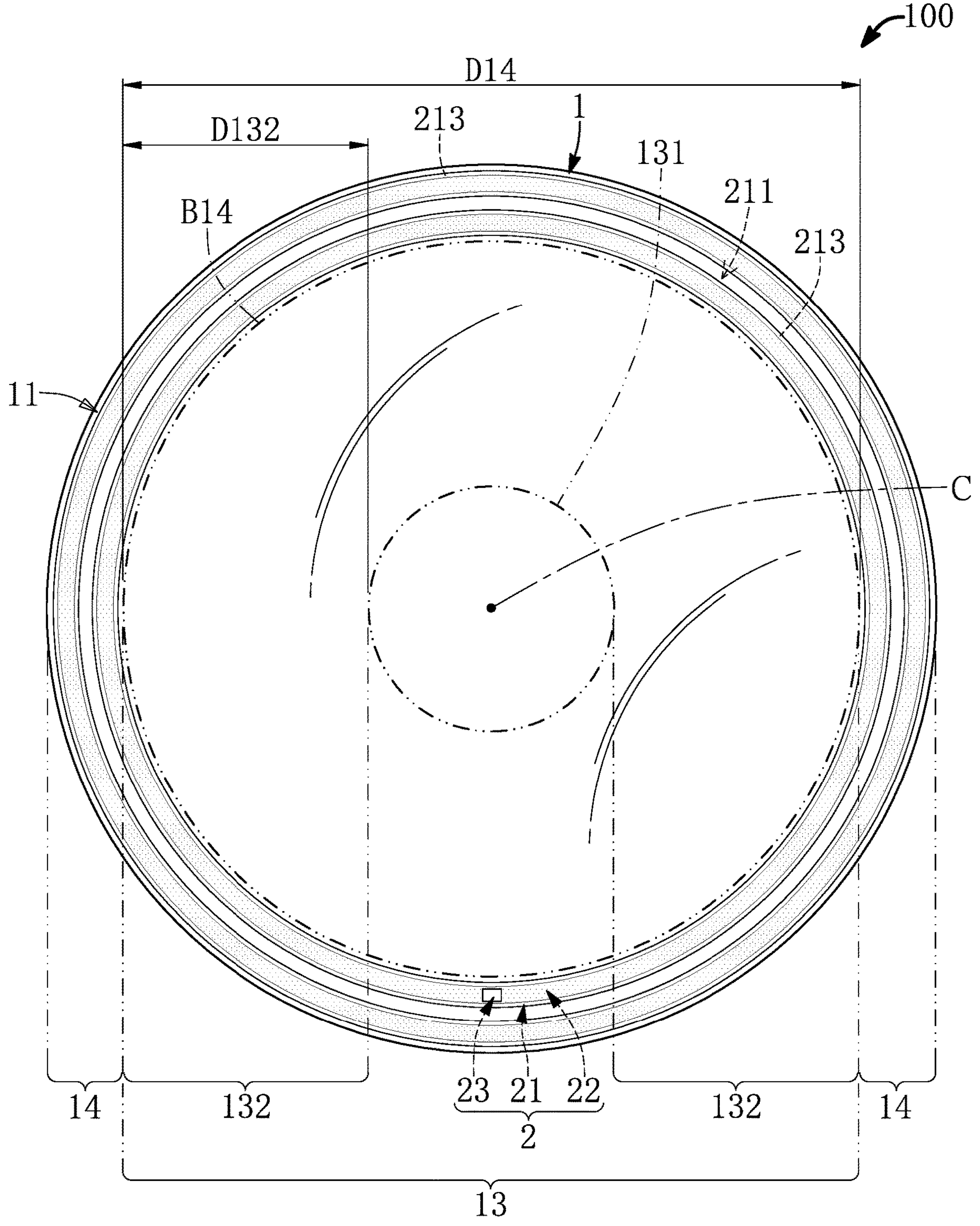
FIG. 12 is a schematic top view of the contact lens in another configuration according to the second embodiment of the present disclosure.
Figure 13:
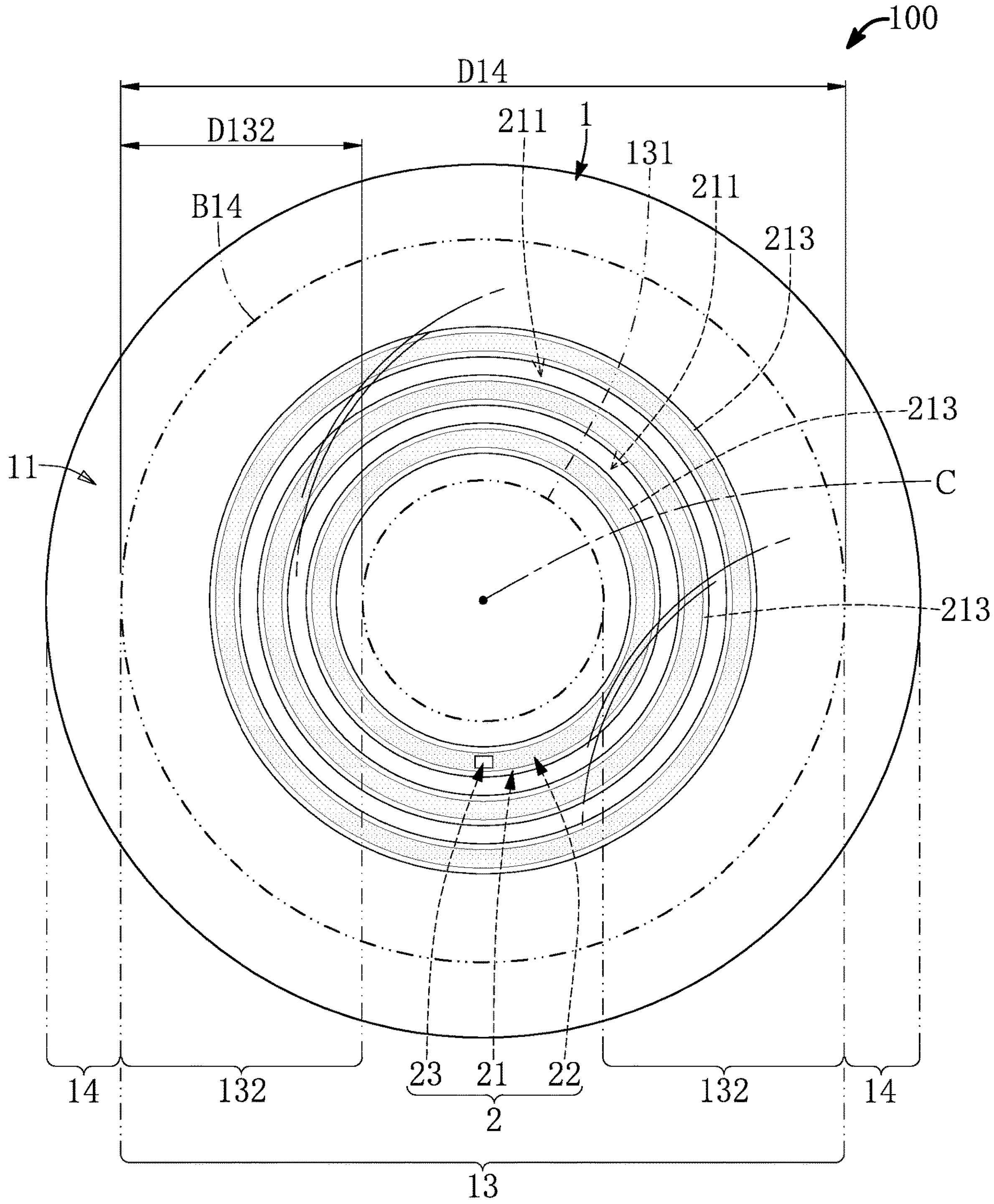
FIG. 13 is a schematic top view of the contact lens in yet another configuration according to the second embodiment of the present disclosure.

In the present embodiment, the embedded structure 2 is embedded in the lens body 1 and is arranged outside of the layout boundary 131. In other words, the embedded structure 2 in the present embodiment is excluded from being arranged inside of the layout boundary 131. Specifically, the embedded structure 2 of the present embodiment disclosed in the following description is described as shown in FIG. 8 to FIG. 11 and is only embedded in the sclera portion 14 and the annular layout region 132 of the lens body 1, but the present disclosure is not limited thereto. According to various requirements, the embedded structure 2 can be only embedded in the sclera portion 14 of the lens body 1 as shown in FIG. 12; or, the embedded structure 2 can be only embedded in the annular layout region 132 of the lens body 1 as shown in FIG. 13.

Moreover, as shown in FIG. 8 to FIG. 11, along the top-down direction T parallel to the central axis C, at most 70% of the area of the annular layout region 132 of the cornea portion 13 is shielded by the embedded structure 2. It should be noted that the above percentage can be adjusted or changed according to different design requirements (e.g., various design requirements of oxygen permeability).

For example, according to different design requirements, 50% to 70% of the area of the annular layout region 132 is shielded along the top-down direction T by the embedded structure 2 so as to have an oxygen permeability that is 70% to 30% of the basic oxygen permeability; or, 30% to 50% of the area of the annular layout region 132 is shielded along the top-down direction T by the embedded structure 2 so as to have an oxygen permeability that is 85% to 70% of the basic oxygen permeability; or, 6% to 30% of the area of the annular layout region 132 is shielded along the top-down direction T by the embedded structure 2 so as to have an oxygen permeability that is 100% to 85% of the basic oxygen permeability.

Specifically, the embedded structure 2 can be in cooperation with the cornea portion 13 and the sclera portion 14 to precisely control the oxygen permeability of the annular layout region 132. The embedded structure 2 preferably includes at least part of the following technical features. For example, the 3D carrier 21 can effectively control the annular layout region 132 to meet a specific design requirement of the oxygen permeability by forming at least one oxygen permeable channel 211 having a central angle of 360 degrees with respect to the central axis C.

In the present embodiment, the 3D carrier 21 includes a plurality of annular segments 213 spaced apart from each other, and a quantity of the at least one oxygen permeable channel 211 formed in the 3D carrier 21 is more than one. Each of the oxygen permeable channels 211 is in an (circular) annular shape, and any two of the annular segments 213 adjacent to each other have one of the oxygen permeable channels 211 therebetween. The 3D carrier 21 is not in contact with any one of the front surface 11 and the rear surface 12 of the lens body 1 (e.g., the 3D carrier 21 is substantially spaced apart from any one of the front surface 11 and the rear surface 12 by a same distance).

Moreover, centers of the annular segments 213 are located on the central axis C, and the annular segments 213 are spaced apart from each other along the top-down direction T and respectively have different inner diameters. In other words, along the top-down direction T parallel to the central axis C, the connection boundary B14, the layout boundary 131, and outer edges of the annular segments 213 are concentric circles, the annular segments 213 are not overlapped with each other, and the annular segments 213 are separated from each other by the oxygen permeable channels 211.

Specifically, in a cross section of the contact lens 100 having the central axis C, each of the annular segments 213 has two sections respectively located at two opposite sides of the central axis C, the sections of the annular segments 213 located at one of the two opposite sides of the central axis C are arranged along a first arrangement direction L1, the sections of the annular segments 213 located at another one of the two opposite sides of the central axis C are arranged along a second arrangement direction L2, and an arrangement angle σ213 between the first arrangement direction L1 and the second arrangement direction L2 is preferably within a range from 60 degrees to 160 degrees. In the cross section of the contact lens 100 provided by the present embodiment, the first arrangement direction L1 and the second arrangement direction L2 intersect at the central axis C, and the central axis C is an angle bisector of the arrangement angle σ213, but the present disclosure is not limited thereto.

Beneficial Effects of the Embodiments

In conclusion, the lens body of the contact lens in the present disclosure is designed according to the structure of the eye to provide a suitable region or boundary (e.g., the layout boundary defined by the cornea portion) for embedding the embedded structure, such that more requirements for oxygen permeability can be met through the cooperation of components of the contact lens (e.g., at most 70% of the area of the annular layout region is shielded along the top-down direction by the embedded structure).

Moreover, in the contact lens provided by the present disclosure, the structural design of the 3D carrier (e.g., the at least one oxygen permeable channel formed on the 3D carrier has a central angle of 360 degrees with respect to the central axis) enables the annular layout region to allow oxygen to pass therethrough, so that a percentage of the annular layout region that is shielded by the 3D carrier along the top-down direction can be less than a percentage by which the oxygen permeability of the annular layout region is reduced.

In addition, the contact lens provided by the present disclosure can effectively control the annular layout region to meet a specific design requirement of the oxygen permeability through a specific structural arrangement of the 3D carrier (e.g., a specific range of the lead angle; a specific range of the arrangement angle; or, the spiral segments or the annular segments not being overlapped with each other along the top-down direction and being separated from each other by at least one the oxygen permeable channel).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A contact lens, comprising:

a lens body including a cornea portion defining a central axis and a sclera portion that surrounds the cornea portion, wherein a connection boundary between the cornea portion and the sclera portion has an inner diameter within a range from 11.5 mm to 12.3 mm, and wherein the cornea portion defines a layout boundary spaced apart from the connection boundary by a distance that is within a range from 3.8 mm to 4.2 mm; and an embedded structure embedded in the lens body and arranged outside of the layout boundary, wherein the embedded structure includes a three-dimensional (3D) carrier having at least one oxygen permeable channel that has a central angle of 360 degrees with respect to the central axis;

wherein, along a top-down direction parallel to the central axis, the layout boundary and the connection boundary jointly define an annular layout region therebetween, and at most 70% of an area of the annular layout region is shielded by the embedded structure;

wherein the annular layout region has a first oxygen permeability when the embedded structure is not embedded in the annular layout region, and wherein along a top-down direction parallel to the central axis, 50% to 70% of the area of the annular layout region is shielded by the embedded structure, and the annular layout region has a second oxygen permeability that is 70% to 30% of the first oxygen permeability.

2. The contact lens according to claim 1, wherein the 3D carrier is in a spiral shape, and a quantity of the at least one oxygen permeable channel is one, and wherein the oxygen permeable channel has a spiral shape and is arranged along the 3D carrier.

3. The contact lens according to claim 2, wherein the 3D carrier spirally extends along the central axis from the layout boundary toward the sclera portion by extending across the connection boundary.

4. The contact lens according to claim 3, wherein the 3D carrier includes a plurality of spiral segments that are connected end to end, and at least one of the spiral segments is embedded in the annular layout region and has a central angle of 360 degrees with respect to the central axis.

5. The contact lens according to claim 4, wherein, along the top-down direction parallel to the central axis, the spiral segments are not overlapped with each other, and the spiral segments are separated from each other by the oxygen permeable channel.

6. The contact lens according to claim 2, wherein the lens body has a front surface and a rear surface that is opposite to the front surface, the 3D carrier is not in contact with any one of the front surface and the rear surface, and the 3D carrier has a lead angle within a range from 10 degrees to 75 degrees.

7. The contact lens according to claim 1, wherein the 3D carrier includes a plurality of annular segments spaced apart from each other, and a quantity of the at least one oxygen permeable channel is more than one, and wherein each of the oxygen permeable channels is in an annular shape, and any two of the annular segments adjacent to each other have one of the oxygen permeable channels therebetween.

8. The contact lens according to claim 7, wherein centers of the annular segments are located on the central axis, and the annular segments are spaced apart from each other along the top-down direction and respectively have different inner diameters.

9. The contact lens according to claim 7, wherein, along the top-down direction parallel to the central axis, the connection boundary, the layout boundary, and outer edges of the annular segments are concentric circles.

10. The contact lens according to claim 9, wherein, along the top-down direction parallel to the central axis, the annular segments are not overlapped with each other, and the annular segments are separated from each other by the oxygen permeable channels.

11. The contact lens according to claim 7, wherein the lens body has a front surface and a rear surface that is opposite to the front surface, and the annular segments are not in contact with any one of the front surface and the rear surface.

12. The contact lens according to claim 7, wherein, in a cross section of the contact lens having the central axis, each of the annular segments has two sections respectively located at two opposite sides of the central axis, the sections of the annular segments located at one of the two opposite sides of the central axis are arranged along a first arrangement direction, the sections of the annular segments located at another one of the two opposite sides of the central axis are arranged along a second arrangement direction, and an arrangement angle between the first arrangement direction and the second arrangement direction is within a range from 60 degrees to 160 degrees.

13. The contact lens according to claim 12, wherein in the cross section of the contact lens having the central axis, the first arrangement direction and the second arrangement direction intersect at the central axis, and the central axis is an angle bisector of the arrangement angle.

14. The contact lens according to claim 1, wherein the embedded structure is only embedded in the sclera portion of the lens body.

15. The contact lens according to claim 1, wherein the embedded structure is only embedded in the annular layout region of the lens body.

16. The contact lens according to claim 1, wherein the embedded structure is only embedded in the sclera portion and the annular layout region of the lens body.

17. The contact lens according to claim 1, wherein the embedded structure includes a circuit formed on the 3D carrier and an electronic component that is assembled to the 3D carrier, and the electronic component is electrically coupled to the circuit through the 3D carrier.

18. A contact lens, comprising:

a lens body including a cornea portion defining a central axis and a sclera portion that surrounds the cornea portion, wherein a connection boundary between the cornea portion and the sclera portion has an inner diameter within a range from 11.5 mm to 12.3 mm, and wherein the cornea portion defines a layout boundary spaced apart from the connection boundary by a distance that is within a range from 3.8 mm to 4.2 mm; and an embedded structure embedded in the lens body and arranged outside of the layout boundary, wherein the embedded structure includes a three-dimensional (3D) carrier having at least one oxygen permeable channel that has a central angle of 360 degrees with respect to the central axis;

wherein, along a top-down direction parallel to the central axis, the layout boundary and the connection boundary jointly define an annular layout region therebetween, and at most 70% of an area of the annular layout region is shielded by the embedded structure;

wherein the annular layout region has a first oxygen permeability when the embedded structure is not embedded in the annular layout region, and wherein along a top-down direction parallel to the central axis, 30% to 50% of the area of the annular layout region is shielded by the embedded structure, and the annular layout region has a second oxygen permeability that is 85% to 70% of the first oxygen permeability.

19. A contact lens, comprising:

a lens body including a cornea portion defining a central axis and a sclera portion that surrounds the cornea portion, wherein a connection boundary between the cornea portion and the sclera portion has an inner diameter within a range from 11.5 mm to 12.3 mm, and wherein the cornea portion defines a layout boundary spaced apart from the connection boundary by a distance that is within a range from 3.8 mm to 4.2 mm; and an embedded structure embedded in the lens body and arranged outside of the layout boundary, wherein the embedded structure includes a three-dimensional (3D) carrier having at least one oxygen permeable channel that has a central angle of 360 degrees with respect to the central axis;

wherein, along a top-down direction parallel to the central axis, the layout boundary and the connection boundary jointly define an annular layout region therebetween, and at most 70% of an area of the annular layout region is shielded by the embedded structure;

wherein the annular layout region has a first oxygen permeability when the embedded structure is not embedded in the annular layout region, and wherein along a top-down direction parallel to the central axis, 6% to 30% of the area of the annular layout region is shielded by the embedded structure, and the annular layout region has a second oxygen permeability that is 100% to 85% of the first oxygen permeability.

* * * * *